(12) United States Patent
Howard et al.

(10) Patent No.: US 8,359,263 B1
(45) Date of Patent: Jan. 22, 2013

(54) LOAN PRODUCT WITH CONVERTIBLE PAYMENT TERMS

(75) Inventors: Pamela M. Howard, Gresham, OR (US); Kim T. Barbour, Lighthouse Point, FL (US)

(73) Assignee: Bank of America Corporation, Charlotte, NC (US)

( * ) Notice: Subject to any disclaimer, the term of this patent is extended or adjusted under 35 U.S.C. 154(b) by 572 days.

(21) Appl. No.: 12/328,895

(22) Filed: Dec. 5, 2008

(51) Int. Cl.
*G00F 40/00* (2006.01)

(52) U.S. Cl. .......................................... 705/38; 705/35

(58) Field of Classification Search ..................... 705/38
See application file for complete search history.

(56) References Cited

U.S. PATENT DOCUMENTS

| | | | |
|---|---|---|---|
| 5,870,720 A | 2/1999 | Chusid et al. | |
| 7,089,503 B1 | 8/2006 | Bloomquist et al. | |
| 7,249,099 B2 | 7/2007 | Ling | |
| 2001/0054022 A1* | 12/2001 | Louie et al. | 705/38 |
| 2002/0046144 A1* | 4/2002 | Graff | 705/36 |
| 2008/0120211 A1 | 5/2008 | Oppenheimer et al. | |
| 2008/0120215 A1* | 5/2008 | Wagner | 705/35 |

OTHER PUBLICATIONS

Uhlmann Charles E; System and Method for Providing a Custom Hedged Adjustable Rate Mortgage; 2006; WIPO/Thomas; 17/3,K/10 (Item 10 from file: 349).*
Gang John, E; System and Method for Facilitating Sale of a Loan to a Secondary Market Purchaser; 2002; WIPO/Thomas; 17/3,K/18 (Item 18 from file: 349.*
Raines Franklin D; Combined First Mortgage and Home Equity Line of Credit Product and Method; 2000; WIPO/Thomas; 17/3,K/30 (Item 30 from file: 349).*
Harney, Kenneth R., "Freddie Mac's 'Modifiable Mortgage' Could be The Rage Next Time Interest Rates Drop", published Mar. 11, 2002 (5 pages total); http://www.realtytimes.com/rtpages/20020311_modifiablemtg.htm.
Lewis, Holden (Bankrate.com), "Mortgage Modification, Easy Refis Available", Jul. 3, 2002 (1 page total); http://www.bankrate.com/brm/news/mtg/20020704a.asp.
U.S. Appl. No. 12/872,922, filed Aug. 31, 2010, Shane A. Johnson et al.
U.S. Appl. No. 12/872,929, filed Aug. 31, 2010, Shane A. Johnson et al.

\* cited by examiner

*Primary Examiner* — Charles Kyle
*Assistant Examiner* — Michael Cranford
(74) *Attorney, Agent, or Firm* — Michael A. Springs; Moore & Van Allen PLLC; Padowithz Alce

(57) ABSTRACT

Apparatus and methods for converting a scheduled loan payment between a composite amount and an interest-only amount. A scheduled loan payment may be converted between a composite amount and an interest-only amount. The composite amount may have a first component that includes outstanding principle and a second component that includes interest based on the outstanding principle. Loan payments in the composite amount may be received for a period of time. Upon request by the customer for activation of a payment schedule conversion feature, subsequent scheduled loan payments may be converted from composite payments to interest-only payments. After the payment schedule conversion feature is deactivated, the apparatus and methods may convert subsequent loan payments from interest-only back to a composite amount. Conversion to interest-only payments may be subject to satisfaction of lending risk attenuation criteria.

32 Claims, 5 Drawing Sheets

LOAN PRODUCT WITH CONVERTIBLE PAYMENT TERMS

FIELD OF TECHNOLOGY

Aspects of the disclosure relate to providing apparatus and methods for providing a loan product that has flexible payment amounts. In particular, the disclosure relates to apparatus and methods for allowing a mortgagor to select one or more periods of time for making interest-only payments.

BACKGROUND

From time to time, one that makes payments on a real estate loan or other type of loan may desire to improve his cash flow. For example, a home owner making mortgage payments may undertake to pay for a child's college education, may undergo a career transition or may retire. In such situations, it may be desirable to reduce basic monthly expenditures to accommodate increased expenses or decreased income.

Conventional ways to improve cash flow in connection with the real estate or other loan (hereinafter, "the loan") include refinancing the loan and/or reducing equity in loan collateral. Refinancing is a solution that depends on interest rates. Refinancing can require the payment of closing costs and the investment of time and effort. Reduction of equity is a solution that may affect borrowing power and financial security.

Conventional interest-only features of loans are designed to reduce the cash flow impact at the inception of a loan payback period, but lack flexibility to manage cash flow as the loan matures.

It would be desirable, therefore, to provide a loan product having an interest-only period that may be extended to the full term of a loan.

It also would be desirable, therefore, to provide a loan product having payment terms that may be switched between interest-only and amortizing.

SUMMARY OF THE INVENTION

It is an object of the invention to provide a loan product having an interest-only period that may be extended to the full term of a loan. Apparatus and methods for converting a scheduled loan payment between a composite amount and an interest-only amount, therefore, are provided. The composite amount may have a first component that includes outstanding principle and a second component that includes interest based on the outstanding principle. The interest may be compounded in any suitable manner. The interest-only amount may include only the interest based on outstanding principle. The apparatus and methods may involve converting a scheduled loan payment between such a composite amount and an interest-only amount.

The apparatus and methods may involve receiving loan payments in the composite amount for an initial period of time. The apparatus and methods may involve electronically receiving a customer request for activation of a payment schedule conversion feature and issuing to the customer a statement that includes an amount due corresponding to the interest-only amount.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
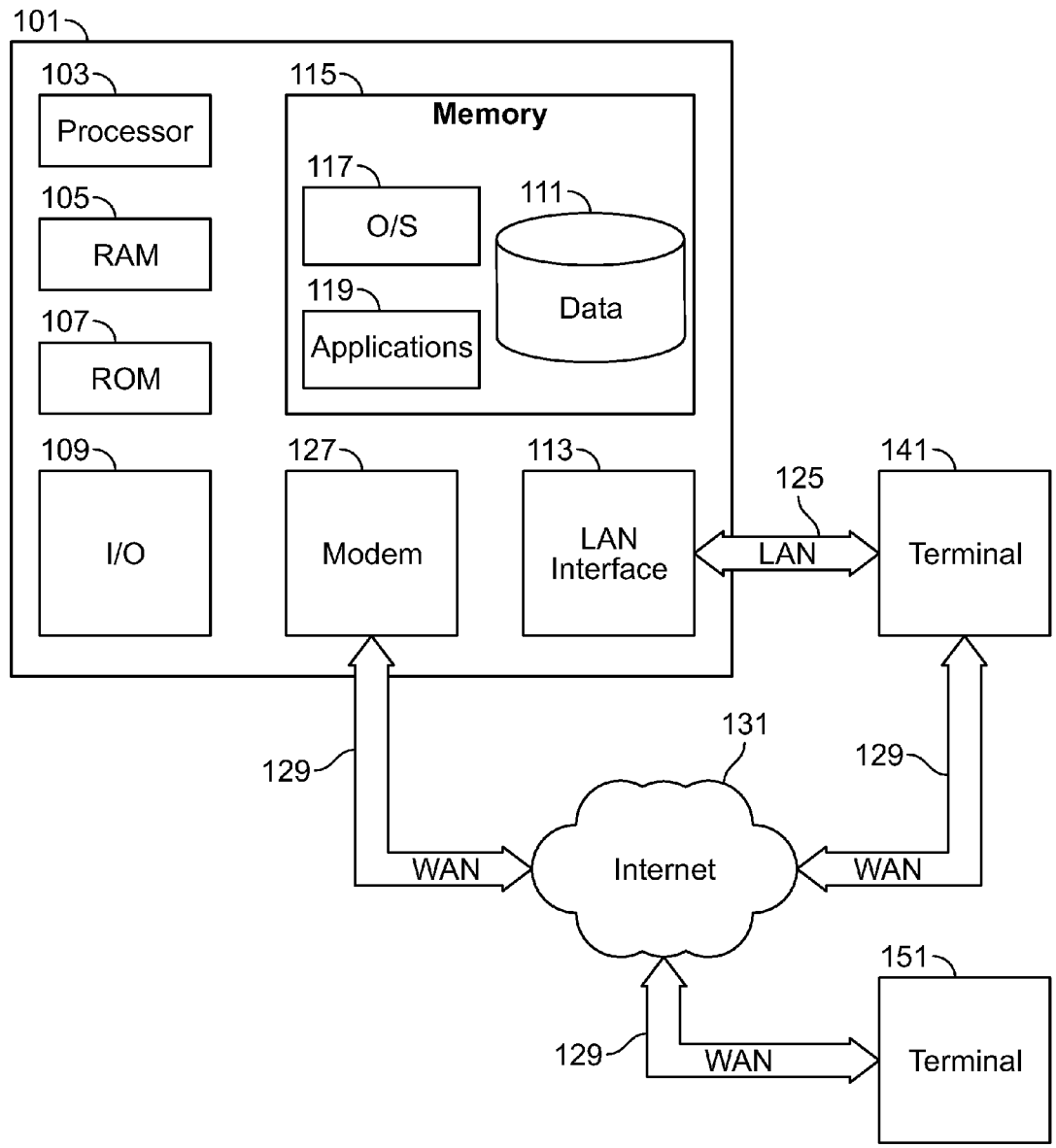
FIG. 1 shows an illustrative diagram of apparatus that may be used in connection with the principles of the invention.

Apparatus and methods for converting a scheduled loan payment between a composite amount and an interest-only amount are provided. The loan may be issued by a financial institution to a customer. For example, the loan may be for a portion of the purchase price of a home or other property. The home or other property may serve as collateral for the loan.

Scheduled loan payments may include any payments that are to be made over time pursuant to the terms of a loan. The apparatus and methods may involve converting a scheduled loan payment between a composite amount and an interest-only amount. The composite amount may have a first component that includes outstanding principle and a second component that includes interest based on outstanding principle. The interest may be compounded in any suitable manner. The interest-only amount may include only the interest based on outstanding principle.

The apparatus and methods may involve receiving loan payments in the composite amount for an initial period of time. Upon request by the customer for activation of a payment schedule conversion feature, subsequent scheduled loan payments may be converted from composite payments to interest-only payments. After the payment schedule conversion feature is deactivated, the apparatus and methods may convert subsequent loan payments from interest-only back to a composite amount.

When the payments revert to a composite amount, the dollar-value of the composite amount may be based on outstanding principal and time remaining on the loan. In some embodiments, the time remaining on the loan may be changed.

A financial institution that offers such a payment schedule conversion feature may be exposed to lending risk associated with the feature. In some embodiments of the invention, the lending risk may be attenuated by requiring that the customer build equity in the loan collateral during an initial period of the loan. In some embodiments, the lending risk may be attenuated by requiring that the customer hold a minimum amount of equity in the collateral before the scheduled payments are converted from composite to interest-only. The minimum amount of equity may be expressed as an absolute amount of equity, a fraction of the value of the collateral or any other suitable quantity. The value of the collateral may be based on the purchase price of the collateral, an appraisal, a revised appraisal or any other suitable metric.

In some embodiments, a statement may be issued to the customer from time to time or on a regular basis. Such a statement may show an amount due. Prior to activation of the scheduled payment conversion feature, the amount due may be a composite amount. During an activation period of the scheduled payment conversion feature, the amount due may be an interest-only amount. The issuance of a statement that has an amount due corresponding to the interest-only amount may be contingent upon satisfaction of lending risk attenuation criteria. Apparatus and methods that issue such statements may be configured such that the statements will be issued only during such an activation period. Such a configuration may or may not include using a processor to confirm activation of the conversion feature before issuance of the statement.

Subject to any lending risk attenuation measures that may be in place, the customer may request activation of the payment schedule conversion feature at any time during the life of the loan or for any length of time (subject to any minimum required length) during the term of the loan. The customer may request activation of the payment schedule conversion feature once, twice or as many times as the customer desires during the life of the loan.

The apparatus and methods may change the amortization period of the loan.

Loan payments include both interest and principal over the term of the loan. In general, payments at the beginning of the term include more interest than principal. Payments at the end of the term include more principal than interest. Payments that include interest-only can reduce a customer's cash flow. The reduction of cash flow by paying interest-only may be greater toward the end of the loan term, because that is the portion of the term during which interest is minimal.

Table 1 shows an example of payment reductions that may be obtained by use of interest-only payments. The amounts in Table 1 are based on a $300,000.00 loan issued at 6.00% for 30 years. In a fully amortizing phase of the loan, monthly payments would include principal and interest. The fully amortizing monthly payment amount would be $1,798.65. Monthly payment reductions for payments in years 5, 7 and 10 of the term are $402.83, $454.06 and $543.43, respectively.

TABLE 1

Monthly payment reduction based on $300,000.00 30-year loan at %6.00/ann.

| Payment period (yr. into loan term) | Principal balance at end of period ($) | Interest-only monthly payment ($) | Monthly payment reduction based on interest-only payment ($) |
|---|---|---|---|
| 5 | 279,163 | 1,395.82 | 402.83 |
| 7 | 268,918 | 1,344.59 | 454.06 |
| 10 | 251,043 | 1,255.22 | 543.43 |

The conversion of payments to interest-only, therefore, may provide the customer with reduced monthly payments. The interest-only payments may be based on the principal balance when the interest-only feature is activated. The loan principal amount may remain unchanged during a period of interest-only payments.

The apparatus and methods of the invention may be used by a financial institution to offer to a customer a loan product in which the customer may change his payment schedule between fully amortizing and interest-only. That is, the payment schedule may be changed from fully amortizing to interest-only and from interest-only to fully amortizing. In some embodiments, the customer may extend the term of the loan to a later terminal date.

In some embodiments of the invention, the loan product may include a payment schedule conversion feature. The conversion feature may be provided to a customer along with the loan product. The conversion feature may be integral to the loan product. The loan product may be a primary mortgage, a refinance, a line of credit or any other suitable lending instrument. The financial institution may collect a fee in exchange for provision of, and/or activation of, the conversion feature.

In some embodiments, the loan product may include an initial equity-building phase. In those embodiments, the customer may make amortizing payments to build equity. After the initial equity-building phase, the customer may activate the payment schedule conversion feature.

In some embodiments, the customer may activate the payment schedule conversion feature for a fixed period during the loan term. At the end of the fixed period, the payment schedule would revert to fully amortizing. When the customer wants to activate the payment schedule conversion feature, the activation may be subject to a lending test such as a minimum lending test. For example, the financial institution may condition the activation on the customer holding a minimum equity position in the loan collateral. The minimum equity position may be Q % of the value of the collateral. Q may be any suitable number, such as 5, 7, 10 or any other suitable number. The collateral value may be an appraised value, a reappraised value, a sale price or a market price. In some embodiments, the minimum equity position may be 5% of the original sale price of the collateral.

In some embodiments, activation of the payment schedule conversion feature may require a selection by the customer of the length of the interest-only period. For example, if the customer activates the payment schedule conversion feature at the beginning of year 11 of a thirty-year loan, the customer may select a 3-year period of interest-only payments. Interest-only payments would be made during years 11, 12 and 13. Fully amortizing payments would then resume at the beginning of year 14. In some embodiments, the interest-only period may have a minimum duration. For example, the financial institution may require that an interest-only period be no shorter than 12 months or any other suitable length of time.

In some embodiments, the customer may activate the payment schedule conversion feature more than once during the loan term. Each activation may be subject to the lending test.

In some embodiments, resumption of fully amortizing payments may be based on the original termination date of the loan. In the example above, fully amortizing payments would resume at the beginning of year 14 and continue through the end of year 30 (assuming, for the sake of simplicity, that there is no subsequent activation of the payment schedule conversion feature). Thus, the remaining principal would be amortized over the 17 years remaining in the original term of the loan. Because no amortization occurred during the interest-only period, the customer's fully amortizing payments in years 14 to 30 would be greater than the fully amortizing payments in years 1 to 10.

In some embodiments, the customer may elect to reamortize the loan at the conclusion of an interest-only period. Although the reamortization may be based on the resumption of fully amortizing payments at the conclusion of the interest-only period, the election itself may be required to be made when the payment schedule conversion feature is activated. In some embodiments, the reamortization election may be made at the conclusion of the interest-only period.

In some reamortizing embodiments, the customer may select a new loan term. The customer may select a new term that is identical to the old term. The customer may select a new term that is based on a termination date that the customer desires. The customer may select a new term that is based on a monthly payment amount that the customer desires. In the example above, at the end of the interest-only period, the customer would have 17 years remaining in the original term.

The customer may choose to restart the payment of the loan as a 30-year fixed loan based on remaining outstanding principal. The termination of the loan would then be delayed by 13 years (17 years until the original termination date and 13 years of extension, for a total of 30). The customer may choose to delay the termination years for, say, 8 years. This would require amortizing the loan over the 25 years after the close of the interest-only period. (The reamortization examples are, for the sake of simplicity, based on the assumption that no subsequent activation of the payment schedule conversion feature occurs.)

Illustrative embodiments will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 201 computer executable instructions may be embodied in hardware or firmware (not shown). As described in detail below, database 121 may provide storage for loan principal information, collateral information, customer payment information, customer loan feature elections and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Any information described above in connection with database 121, and any other suitable information, may be stored in memory 125.

One or more of applications 119 may include one or more algorithms that may be used to calculate monthly payments, execute lending tests and perform any other suitable tasks related to payment schedule conversion features.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
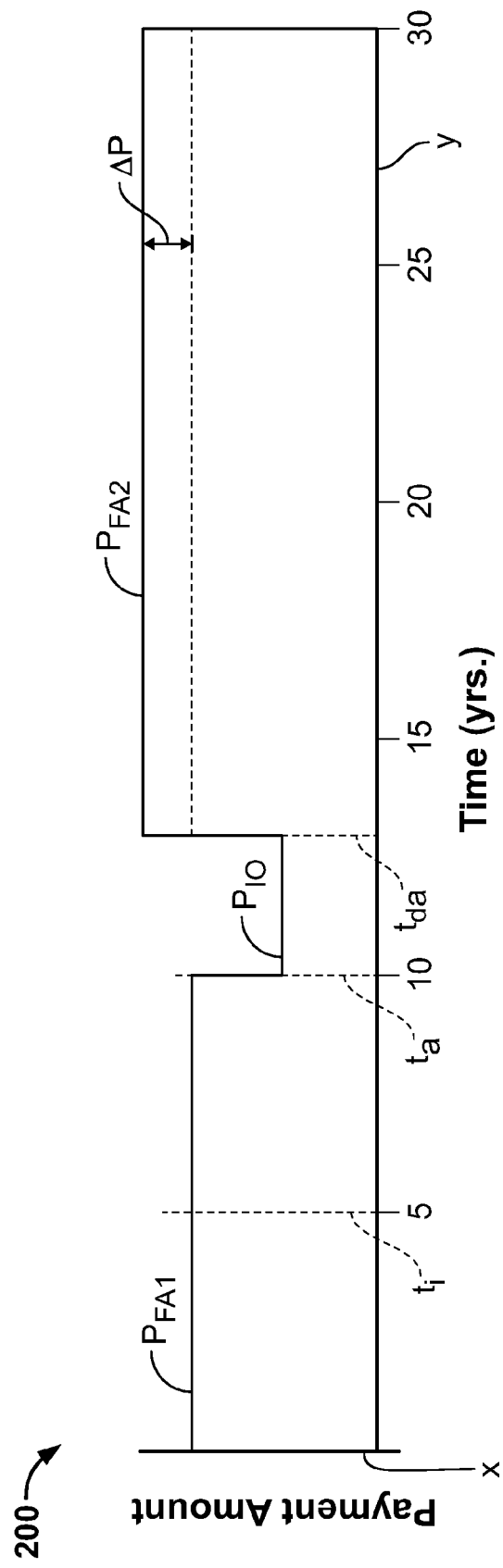
FIG. 2 shows an illustrative timeline in connection with the principles of the invention.

FIG. 2 shows illustrative loan payment schedule 200. Axis X shows relative monthly payment amount. Axis Y shows time in years. $P_{FA1}$ is the initial payment amount based on fully amortizing the loan over 30 years. $t_i$ is the completion of an initial equity building phase. $t_i$ is shown as being 5 years, but any suitable time may be used. At $t_a$, a request for activation of the payment schedule conversion feature is received. The request may include information identifying the length of the period for which the customer desires to make interest-only payments. The request may include information identifying the number of years over which the customer desires to amortize remaining principal at the conclusion of the interest-only period.

In some embodiments, the financial institution may provide the customer with illustrations showing payment amounts that would be required based on different amortization schedules after the conclusion of the interest-only period.

Provided that criteria of a lending test are met, loan payments are adjusted to interest-only payments $P_{IO}$ until time $t_{da}$, when the payment schedule conversion feature is deactivated. When the payment schedule conversion feature is deactivated, the payment amount may be adjusted to $P_{FA2}$. $P_{FA2}$ is the payment amount for the second fully amortizing phase of payment schedule 200. $P_{FA2}$ is greater than $P_{FA1}$ by an amount $\Delta P$. The payments increase by $\Delta P$, because in payment schedule 200, the customer has elected to amortize the remaining principal over the time remaining before the end of the original 30-year term.

Figure 3:
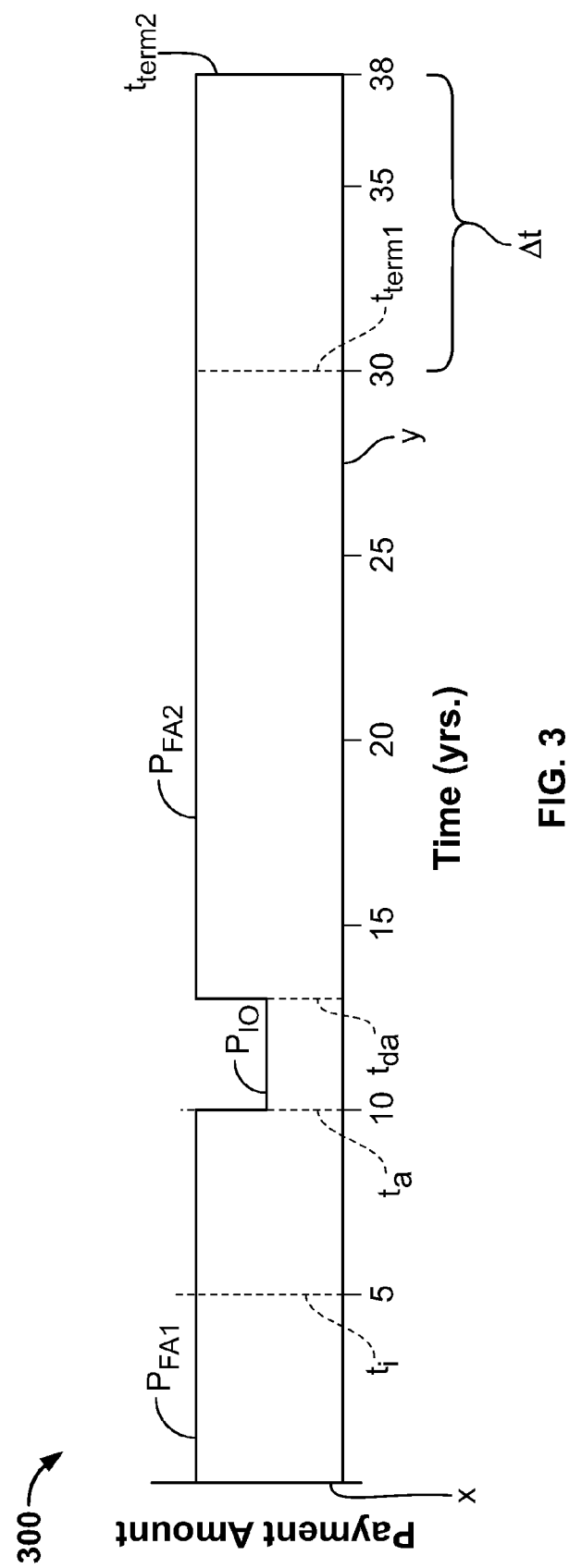
FIG. 3 shows another timeline in connection with the principles of the invention.

FIG. 3 shows illustrative loan payment schedule 300. Loan payment schedule 300 is identical to loan payment schedule 200 prior to time $t_{da}$, when the payment schedule conversion feature is deactivated at the beginning of year 14. In schedule 300, the customer has elected to extend the loan term by $\Delta t$ (8 years), from $t_{term1}$ (30 years) to $t_{term2}$ (38 years). By doing so, the customer has adjusted PFA2 to be equal to $P_{FA1}$. This example is illustrative only and should not be construed as an indication of any quantitative relationship between $\Delta P$ and $\Delta t$.

Figure 4:
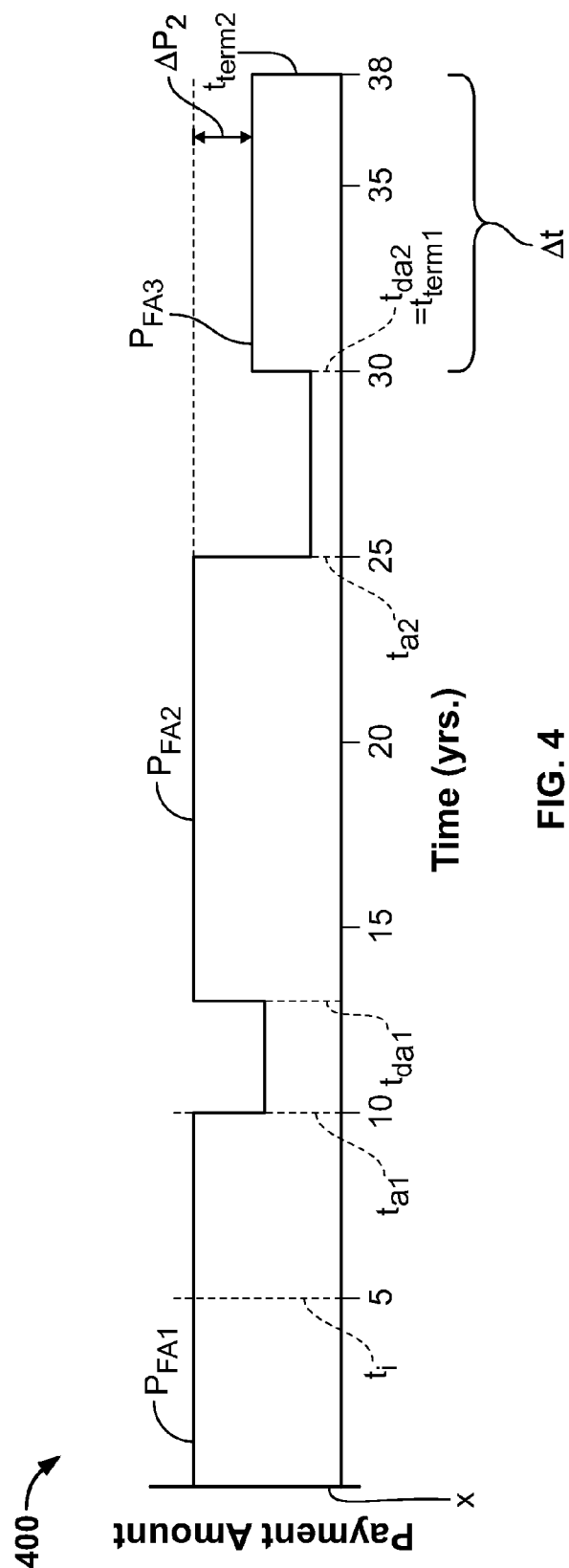
FIG. 4 shows yet another illustrative timeline in connection with the principles of the invention.

FIG. 4 shows illustrative loan payment schedule 400. Loan payment schedule 400 is identical to loan payment schedule 300 prior to $t_{a2}$ (at the end of year 25). ($t_{a1}$ and $t_{da1}$ in schedule 400 correspond to $t_a$ and $t_{da}$, respectively, in schedule 300 (shown in FIG. 3).) In schedule 400, the customer has elected a second interest-only period beginning at $t_{a2}$ (the beginning of year 26). The second interest-only period is selected to have a duration of five years. The payment schedule conversion feature is to be deactivated at $t_{da2}$ (the end of year 30). $t_{da2}$ is the same time as $t_{term1}$, the original termination date of the loan. The customer has elected to extend the loan by $\Delta t$ (8 years), from $t_{term1}$ (30 years) to $t_{term2}$ (38 years). $P_{FA3}$ is the fully amortizing payment amount for the period $\Delta t$. $P_{FA3}$ is smaller than $P_{FA2}$ by amount $\Delta P_2$. This is because the principal that was to have been amortized between $t_{a2}$ and $t_{da2}$ (five years) is now being amortized over the period $\Delta t$ (8 years). This example is illustrative only and should not be construed as an indication of any quantitative relationship between $\Delta P$ and $\Delta t$.

Figure 5:
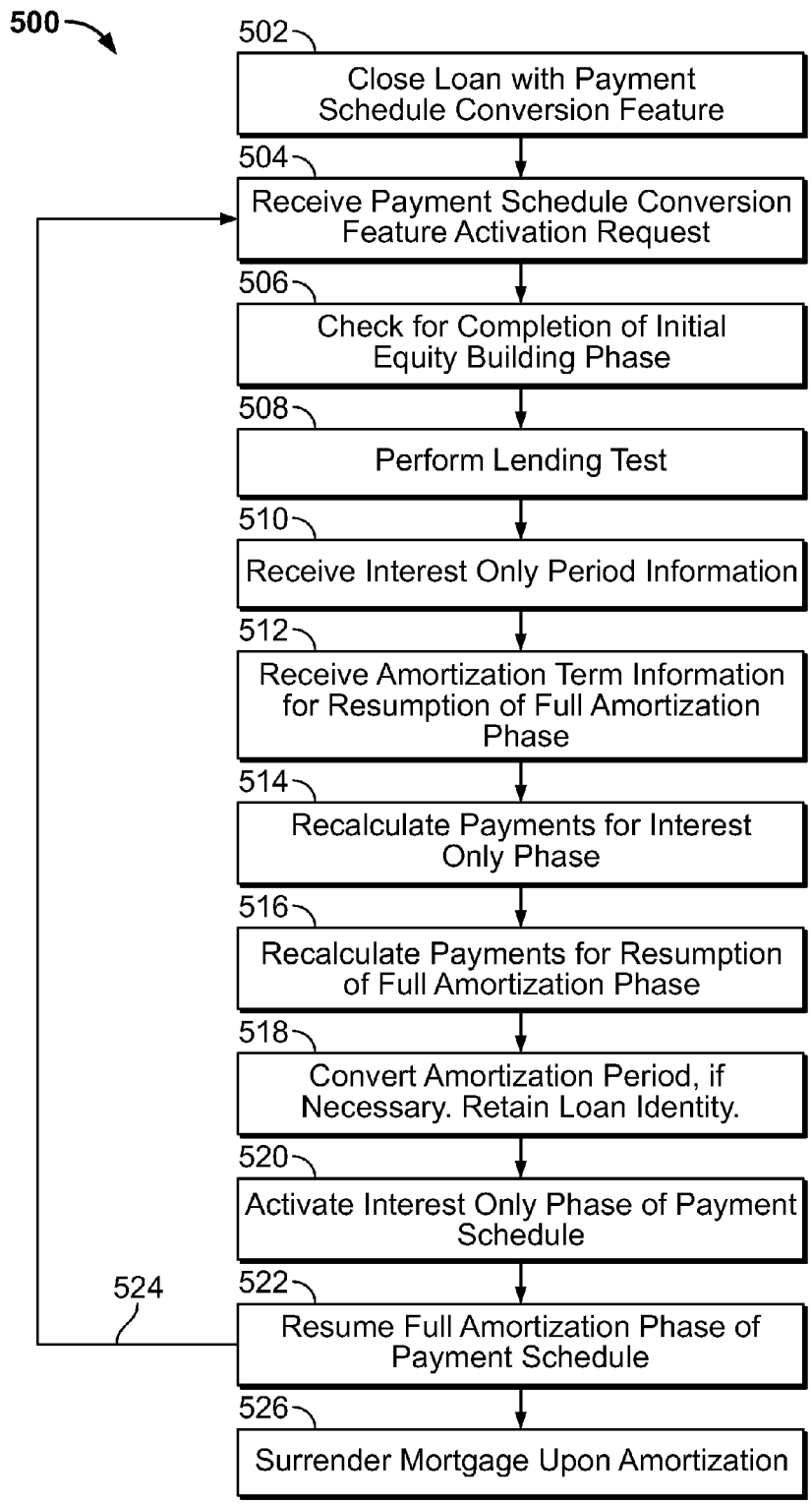
FIG. 5 shows an illustrative process in connection with the principles of the invention.

Processes in accordance with the principles of the invention may include one or more features of the processes illustrated in FIG. 5. For the sake of illustration, the steps of the process illustrated in FIG. 5 will be described as being performed by a "system". The "system" may include one or more of the features of the apparatus shown in FIG. 1 and/or any other suitable device or approach. The "system" may be provided by an entity. The entity may be an individual, an organization or any other suitable entity.

FIG. 5 shows illustrative process 500 for activating and deactivating a payment schedule conversion feature of a loan. Process 500 may begin at step 502. At step 502, the financial institution may close the loan with the customer. The loan terms may include the payment schedule conversion feature. The customer may have the sole right to activate the payment schedule conversion feature. Activation of the payment schedule conversion feature may be subject to conditions that are described above. The system may receive a payment schedule conversion feature activation request at step 504. At step 506, the system may check for completion of an initial equity building phase. At step 508, the system may perform a lending test. At step 510, the system may receive from the customer interest-only period information. The interest-only period information may include a length of time for which payments are to be converted to interest-only. At step 512, the system may receive from the customer amortization term information for resumption of a full amortization phase of the payment schedule.

At step 514, the system may recalculate payment amounts for the interest-only phase. At step 516, the system may recalculate payment amounts for the resumption of the fully amortizing phase. At step 518, the system may change the amortization period that is to govern the loan after the payment schedule conversion feature is deactivated. The system may do so without reinitializing the loan. In some embodiments, the termination date of the loan may be changed without changing a loan identifier such as an account number.

One or more of steps 514, 516 and 518 may be performed in connection with the customer's amount of instructions for activating the payment schedule conversion feature. One or more of steps 514, 516 and 518 may be performed in connection with the financial institution's internal accounting, accounts receivables, regulatory compliance or any other such requirements, whether in connection with the conversion to interest-only or the resumption of full amortization.

At step 520, the system may activate an interest-only phase of the payment schedule. This may involve, for example, generating account statements showing an interest-only amount due, along with any internal record keeping that may be required. At step 522, the system may deactivate the interest-only phase of the payment schedule by resuming full amortization of the loan. This may involve, for example, generating account statements showing an composite principal and interest amount due, along with any internal record keeping that may be required.

After resumption of full amortization, process 500 may proceed along path 524 back to step 504. At step 504, the system may receive another payment schedule conversion feature activation request (as shown, for example, in FIG. 4). Process 500 may then continue through steps 506-522, as discussed. If, after step 522, no further requests for activation of the payment schedule conversion feature are received, process 500 may continue at step 526. At step 526, the loan is fully amortized and the financial institution may surrender a mortgage or engage in other activities that release the customer.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for converting a scheduled loan payment between a composite amount and an interest-only amount have been provided. Persons skilled in the art will appreciate that the present invention can be practiced by other than the described embodiments, which are presented for purposes of illustration rather than of limitation. The present invention is limited only by the claims that follow.

What is claimed is:

1. A method for converting the amount of a scheduled loan payment from a composite amount to an interest-only amount, the composite amount comprising loan principal and interest, the method comprising:
   electronically recording a loan payment by a customer, wherein the loan payment comprises the composite amount, and wherein the loan payment is associated with a loan;
   receiving a request by the customer for activation of a payment schedule conversion feature, wherein activating the conversion feature converts, for an activation period, the amount of the scheduled loan payment from the composite amount to the interest-only amount, wherein the scheduled loan payment is associated with the loan, and wherein the activation period comprises a limited period of time that is at least two months long;
   activating the conversion feature based at least partially on the receiving the request; and
   issuing, to the customer after the activating the conversion feature, a statement that defines an amount due as the interest-only amount.

2. The method of claim 1 further comprising:
   determining an initial time period that runs from an inception date of the loan to the beginning of the activation period; and
   retrieving from computer readable memory an equity building period;
   wherein the activating the conversion feature is conditioned on the initial time period being at least as long as the equity building period.

3. The method of claim 1 further comprising:
   determining an equity held by the customer; and
   calculating an index corresponding to a proportionality between the equity and a collateral value;
   wherein the activating the conversion feature is conditioned on the index satisfying a customer equity criterion.

4. The method of claim 3 wherein the customer equity criterion is satisfied only if the customer equity is at least 5% of the collateral value.

5. The method of claim 3 wherein the collateral value is a purchase price of a home.

6. The method of claim 3 wherein the collateral value is a post-purchase appraisal value.

7. The method of claim 1 further comprising:
   issuing, to the customer after the activation period, a statement that defines an amount due as a second composite amount.

8. The method of claim 7 wherein the loan comprises an amortization date, and wherein the second composite amount is based on a balance payoff period that runs from the end of the activation period to the amortization date.

9. The method of claim 7 wherein the loan comprises an initial amortization date, wherein the composite amount is substantially equal to the second composite amount, and wherein the second composite amount is based on a balance payoff period that runs from the end of the activation period to a revised amortization date.

10. An apparatus for converting the amount of a scheduled loan payment from a composite amount to an interest-only amount, the composite amount comprising loan principal and interest, the apparatus comprising:
   a receiver in electromagnetic communication with a communication network, the receiver being configured to receive a request made by a customer for activation of a payment schedule conversion feature, wherein activating the conversion feature converts, for an activation period, the amount of the scheduled loan payment from the composite amount to the interest-only amount, and wherein the activation period comprises a limited period of time that is at least two months long; and
   a transmitter that is configured to transmit, after the conversion feature is activated, a statement for the customer that defines an amount due as the interest-only amount.

11. The apparatus of claim 10 wherein the activation period is at least 12 months long.

12. The apparatus of claim 10 further comprising a processor that is configured to:
   determine an initial time period that runs from an inception date of the loan to the beginning of the activation period;
   retrieve from computer readable memory an equity building period; and
   instruct the transmitter to transmit the statement only if the initial time period is at least as long as the equity building period.

13. The apparatus of claim 10 further comprising:
   a processor that is configured to:
      determine an equity held by the customer;
      retrieve from computer readable memory a collateral value;
      calculate an index corresponding to a proportionality between the equity and the collateral value; and
      instruct the transmitter to transmit the statement only if the index satisfies a customer equity criterion.

14. The apparatus of claim 13 wherein the customer equity criterion is satisfied only if the customer equity is at least 5% of the collateral value.

15. The apparatus of claim 13 wherein the collateral value is a purchase price of a home.

16. The apparatus of claim 13 wherein the collateral value is a post-purchase appraisal value.

17. The apparatus of claim 10 wherein the loan comprises an amortization date, the apparatus further comprising:
   a processor that is configured to calculate a second composite amount corresponding to a balance payoff period that runs from the end of the activation period to the amortization date.

18. The apparatus of claim 10 wherein the loan comprises an initial amortization date, the apparatus further comprising:
   a processor that is configured to calculate a second composite amount corresponding to a balance payoff period that runs from the end of the activation period to a revised amortization date.

19. The apparatus of claim 18 wherein the second composite amount is substantially equal to the composite amount.

20. One or more computer-readable media storing computer-executable instructions which, when executed by a processor on a computer system, perform a method for converting the amount of a scheduled loan payment from a composite amount to an interest-only amount, the composite amount comprising loan principal and interest, the method comprising:
   receiving a request by a customer for activation of a payment schedule conversion feature, wherein activating the conversion feature converts, for an activation period, the amount of the scheduled loan payment from the composite amount to the interest-only amount, wherein the activation period comprises a limited period of time that is at least two months long;
   storing in computer readable memory information associated with the request; and
   activating the conversion feature based at least partially on the receiving the request.

21. The media of claim 20 wherein, in the method, the activation period is at least 12 months long.

22. The media of claim 20, wherein the method further comprises:
  determining an initial time period that runs from an inception date of the loan to the beginning of the activation period; and
  retrieving from computer readable memory an equity building period;
  wherein the activating the conversion feature is conditioned on the initial time period being at least as long as the equity building period.

23. The media of claim 20 wherein the method further comprises:
  determining an equity held by the customer; and
  calculating an index corresponding to a proportionality between the equity and a collateral value;
  wherein the activating the conversion feature is conditioned on the index satisfying a customer equity criterion.

24. The media of claim 23 wherein, in the method, the customer equity criterion is satisfied only if the customer equity is at least 5% of the collateral value.

25. The media of claim 23 wherein, in the method, the collateral value is a purchase price of a home.

26. The media of claim 23 wherein, in the method, the collateral value is a post-purchase appraisal value.

27. The media of claim 20 wherein the method further comprises:
  issuing, to the customer during the activation period, a first statement that defines an amount due as the interest-only amount; and
  issuing, to the customer after the activation period, a second statement that defines an amount due as a second composite amount.

28. The media of claim 27 wherein, in the method, the loan comprises an amortization date, and wherein the second composite amount is based on a balance payoff period that runs from the end of the activation period to the amortization date.

29. The media of claim 27 wherein, in the method, the loan comprises an initial amortization date, wherein the composite amount is substantially equal to the second composite amount, and wherein the second composite amount is based on a balance payoff period that runs from the end of the activation period to a revised amortization date.

30. One or more computer-readable media storing computer-executable instructions which, when executed by a processor on a computer system, perform a method for converting the amount of a scheduled loan payment from a composite amount to an interest-only amount, the composite amount comprising loan principal and interest, the method comprising:
  receiving a first request by the customer for activation of a payment schedule conversion feature, wherein activating the conversion feature in response to the first request converts, for a first activation period, the amount of the scheduled loan payment from the composite amount to the interest-only amount, wherein the first activation period comprises a limited period of time that is at least two months long;
  issuing to the customer, during the first activation period, a statement that defines an amount due as the interest-only amount;
  receiving a second request by the customer for activation of the payment schedule conversion feature, wherein activating the conversion feature in response to the second request converts, for a second activation period, the amount of a scheduled loan payment from a second composite amount to an interest-only amount, wherein the second activation period comprises a limited period of time that is at least two months long, and wherein the second activation period is different than the first activation period; and
  issuing to the customer, during the second activation period, a statement that defines an amount due as the interest-only amount.

31. The media of claim 30 wherein, in the method, the first and second activation periods are contiguous in time.

32. The media of claim 30 wherein the method further comprises:
  issuing to the customer, after the first activation period and before the second activation period, a statement that defines an amount due as a second composite amount, wherein the second composite amount is based on a principal balance and a balance payoff period commencing at the end of the first activation period.

* * * * *